H. B. SMITH.
Scroll-Saws.
No. 138,103. Patented April 22, 1873.
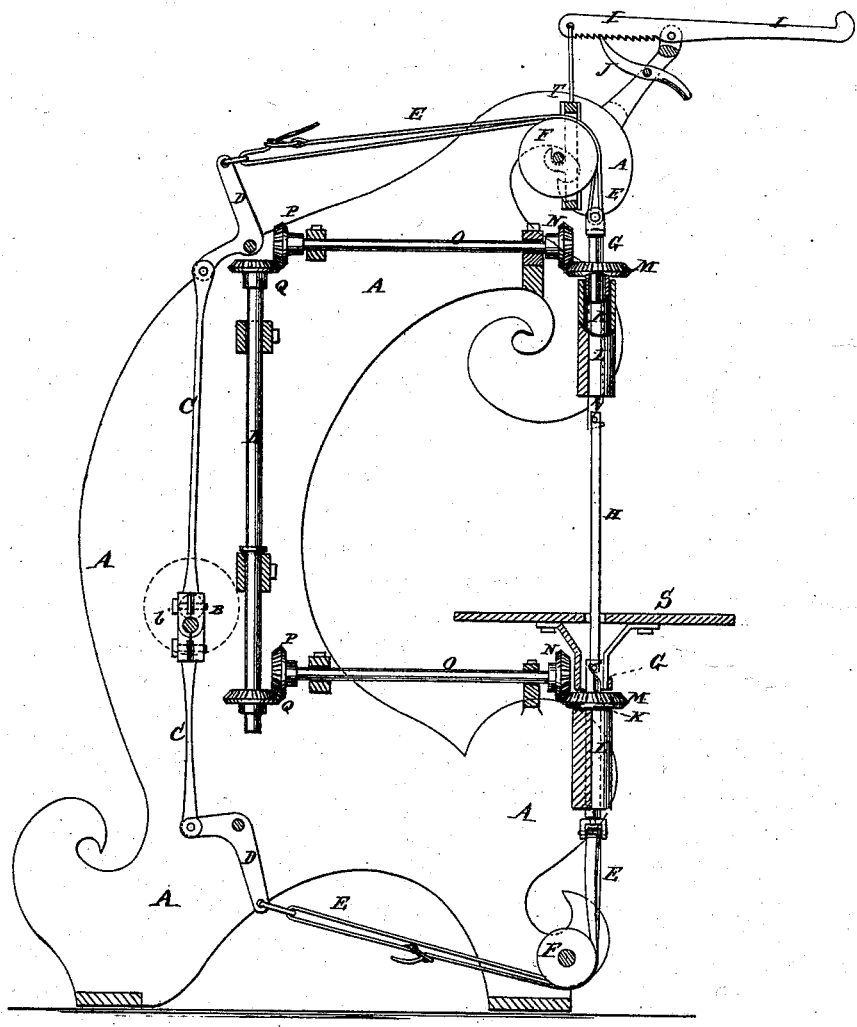
Witnesses:
A. W. Almqvist
C. Sedgwick
Inventor:
H. B. Smith
Per
Attorneys.

UNITED STATES PATENT OFFICE.

HEZEKIAH B. SMITH, OF SMITHVILLE, NEW JERSEY.

IMPROVEMENT IN SCROLL-SAWS.

Specification forming part of Letters Patent No. 138,103, dated April 22, 1873; application filed March 29, 1873.

*To all whom it may concern:*

Be it known that I, HEZEKIAH B. SMITH, of Smithville, in the county of Burlington and State of New Jersey, have invented a new and useful Improvement in Scroll-Saws, of which the following is a specification:

The figure is a vertical section of my improved machine.

My invention has for its object to furnish an improved jig-saw, which shall be so constructed that the work and saw may be rotated by turning the table so as to keep the work from coming in contact with the frame-work of the machine, or with other obstructions, without its being necessary to stop the saw. The invention consists in the combination of the gear-wheels and rods, or equivalent gearing, with the sliding rods that hold the saw and with the table, as hereinafter fully described.

A is the frame-work of the machine, in bearings attached to which revolves the driving-shaft B. Upon the shaft B is formed a cam or crank, $b'$, to receive the rod C, the upper and lower ends of which are pivoted to the arms of the elbow-levers D, which are pivoted at their angles to the frame A. To the other arms of the elbow-levers D are attached straps E, which pass around guide-rollers F and are attached to the outer ends of the square sliding rods G, with the inner or adjacent ends of which the ends of the saw H are connected, so that the saw H may be moved up and down by the revolution of the shaft B. The upper guide-roller F is pivoted in a frame, T, which slides up and down in ways in the frame A, and is connected with a lever, I, pivoted to an arm attached to said frame A and held in place by a pawl, J, pivoted to said arm. This arrangement enables the tension of the saw H to be regulated as desired. The square rods G slide in square holes in the sleeves K, which are placed in sockets L attached to the frame A. With the upper ends of the sleeves K are connected bevel-gear wheels M, the teeth of which mesh into the teeth of bevel-gear wheels N attached to the forward ends of the rods O, which revolve in bearings attached to the frame A. To the rear ends of the rods O are attached bevel-gear wheels P, which mesh into bevel-gear wheels Q attached to the opposite ends of the shaft R, which revolves in bearings attached to the frame A. S is the table upon which the work is placed to be sawn. The table S is rigidly connected with and supported by the lower sleeve K. By this construction, by holding the work fast to the table S and turning the said table in one or the other direction, the saw H will be turned with it so that the work can be fed to the saw in its new direction without delay and without stopping the machine.

Having thus described my invention, I claim as new and desire to secure by Letters Patent—

The combination of the gear-wheels M N P Q and rods O R or equivalent gearing with the sliding rods G and table S, substantially as herein shown and described and for the purpose set forth.

HEZEKIAH B. SMITH.

Witnesses:
GEORGE E. CHAMBERLAIN,
ELSWORTH HOLEMAN.